UNITED STATES PATENT OFFICE.

ST. VRAIN LE SIEUR, OF ST. LOUIS, MISSOURI, ASSIGNOR OF ONE-HALF TO CYRUS A. PETERSON, OF SAME PLACE.

COMPOSITION OF MATTER.

SPECIFICATION forming part of Letters Patent No. 572,645, dated December 8, 1896.

Application filed February 19, 1896. Serial No. 579,964. (No specimens.)

*To all whom it may concern:*

Be it known that I, ST. VRAIN LE SIEUR, a citizen of the United States, residing at St. Louis, State of Missouri, have invented certain new and useful Improvements in Compositions of Matter, of which the following is a specification.

This invention relates to certain new and useful improvements in compositions of matter, and especially adapted for pavements, the peculiarities of which will be hereinafter described and claimed.

The main object of my invention is to provide a durable pavement that possesses a rubbery or elastic and somewhat yielding quality of surface, whether in cold or in hot weather, and is adapted to suit all climates within reasonable changes of temperature.

The usual asphalt pavement is subject to climatic influences, becoming soft in summer, hard and brittle in winter, and deteriorates under the action of animal deposits. It is also frequently objectionable from the sharp ringing click of the horses' hoofs and vehicles traveling upon it. These defects or objections are nearly or quite overcome by my pavement, the essential constituents of which are bitumen, carbonate of lime, and carbonate of magnesia in substantially the proportions as are found in bituminous limestone in the form of Wasatch rock, asphalt, and sand, or their equivalents. The proportions and process are hereinafter set forth, as varied by circumstances and conditions.

In the construction of my pavement I use bituminous limestone found in Utah, on Wasatch Plateau, and known as "Wasatch rock," sometimes called "rock asphalt," containing bitumen in combination with carbonate of lime, carbonate of magnesia, and other ingredients. The composition of Wasatch rock is practically as follows: carbonate of lime about thirty to thirty-three per cent., carbonate of magnesia thirty to thirty-three per cent., and bitumen thirty to thirty-three per cent., the remaining percentage being unimportant ingredients. This special form of bituminous limestone was used by me in the construction of my pavement at Salt Lake City, and I believe it was due to the special proportions of the same in magnesia and bitumen as given above that the excellence of the pavement was obtained. Wasatch rock differs from European limestone very widely in the amount of magnesia and bitumen. The following is the ordinary proportion of ingredients for European limestone: carbonate of lime .80, bitumen .10, carbonate of magnesia .02, iron and clays, &c., .08. The large proportion of magnesia and bitumen in the Wasatch rock is apparent by inspection. An equivalent of substantially the same ingredients and proportions of this Wasatch rock may be used. This is disintegrated by grinding or otherwise to a fine powder. The disintegration may be effected in some kinds, such as a Sicilian limestone, by heating it sufficiently. Thus disintegrated it is added in suitable proportions, as stated presently, to a hot fluid asphaltum flux, with which is then mixed the heated sand or other substance forming a suitable body.

The asphaltum used by me is that known as "gilsonite," containing over ninety-nine per cent. of pure asphalt. "Utahrite," refined, or naturally pure asphalt may be used instead, and the proportions may be varied accordingly. I have also preferably used a petroleum residuum with the gilsonite to form the flux, but in some cases it might be dispensed with.

The sand is preferably clean and sharp and is heated to prevent chilling the mastic formed by the other constituents. The resulting compound is in a moist but not fluid state and is spread on the street by shovels and rakes, is compacted by hand-rollers and then by heavy rollers, as usual in laying asphalt pavement.

The proportions by weight of the above-named ingredients are as follows: For a climate similar to Salt Lake City the preferred parts per ton of two thousand pounds product are: Wasatch bituminous limestone, two hundred pounds; asphalt flux, three hundred pounds; sand, fifteen hundred pounds. This is ten, fifteen, and seventy-five per cent., respectively.

I have made practical experiments that lead me to place the maximum proportion of this special form of bituminous limestone at seven hundred pounds for each three hundred pounds of asphalt flux and one thousand pounds of sand per ton of product to form a tough somewhat soft pavement more suited to cold climates. This is thirty-five, fifteen, and fifty per cent., respectively.

The increase of bituminous limestone above the mean causes first an increase of toughness until an excessive amount produces brittleness and loss of the rubbery, elastic, springing quality obtained when correct proportions are used.

From practical experiments I also place the minimum proportion of bituminous limestone at one hundred pounds for three hundred pounds flux and sixteen hundred pounds sand. This is five, fifteen, and eighty per cent., respectively.

The flux named above is made of "gilsonite" or equivalent, preferably combined with petroleum residuum in the proportion by weight of six parts gilsonite to eight parts petroleum residuum, (.21° Baumé gravity.) I use a petroleum residuum of .21° to .27° (Beaumé) gravity, preferably. That is to say, it is always lighter than water and combines with the gilsonite to form a thin rubbery "bloom" when thrown up by the paddle, but which retains its rubbery, elastic quality in my completed pavement, being protected from disintegration by the water-repelling character of the lime-magnesia ingredients. Therefore, it neither becomes brittle and glassy nor spongy-honeycombed and soft. These are heated and thoroughly combined before adding the powdered bituminous limestone, as stated above. This flux, it is preferred, should only vary in its constituents between substantially the following limits: a maximum of gilsonite nine parts to petroleum residuum seven parts and a minimum of gilsonite five parts to petroleum residuum eight parts, based on a specific gravity of .21° for the latter ingredient.

While petroleum residuum is a preferred ingredient for the asphalt flux on account of its solvent action, yet an equivalent may be used, and under some conditions it may even be dispensed with. The proportion of said flux may be varied from ten per cent. to twenty per cent. of the output, the preferred amount being fifteen per cent., as represented by the three hundred pounds of flux in the above tables.

Taking the preferred proportions for conditions and ingredients as above indicated I heat and stir together substantially one hundred and thirty pounds gilsonite and one hundred and seventy pounds petroleum residuum (.21° gravity) to constitute together three hundred pounds of flux, then stir in substantially two hundred pounds of the previously-disintegrated Wasatch bituminous limestone, and finally mix the previously-heated fifteen hundred pounds of sand with this hot mastic for each ton of the product. The usual asphalt-mixing machine or tumbler may be used for thus mixing the body with the mastic.

The bituminous limestone is a distinct product of the earth, in which the bitumen is intimately combined with the lime constituent. The bitumen in this Wasatch rock used by me is a peculiar bitumen. It takes a comparatively high degree of heat to melt it, 300° Fahrenheit, and the gilsonite requires 310° Fahrenheit. Then in combining these with the other ingredients named in my pavement it is necessary to heat them to 410° Fahrenheit to secure their thorough admixture and combination. The result of this high melting-point as compared with the other forms of bitumen, which run at 150° Fahrenheit or less, is that my pavement does not soften and run under the sun's heat, but remains elastic. The preservation of this characteristic of my pavement against disintegrating influences is secured by the carbonates of lime and magnesia, which ingredients unite to form a hydraulic cement. This causes my pavement to repel the water and animal excreta that penetrate and disintegrate other forms of asphalt not impervious—as mine has proved to be by practical test—to such influences. Its characteristic effect is to toughen the pavement, while it also possesses a binding quality, and thus constitutes a secondary binding ingredient. The asphalt is the main binding ingredient, however, and in a residuum oil having an asphalt base no further addition of asphalt to sand and a Wasatch bituminous limestone may be needed.

Having thus fully described my invention, what I claim as new, and desire to secure by Letters Patent, is—

1. A composition of matter comprising gilsonite, a bitumen melting at 300° Fahrenheit or more, carbonate of lime, and carbonate of magnesia, substantially as described.

2. A composition of matter comprising sand, asphalt, a residuum oil lighter than water, carbonate of lime, and a bituminous limestone containing substantially thirty per cent. of carbonate of magnesia substantially as described.

3. A composition of matter comprising sand, asphalt, petroleum residuum oil lighter than water, and a bituminous limestone composed substantially of one-third each of bitumen, carbonate of lime, and carbonate of magnesia.

In testimony whereof I affix my signature in presence of two witnesses.

ST. VRAIN LE SIEUR.

Witnesses:
L. D. CONE,
H. M. PLAISTED.